United States Patent
Song et al.

(10) Patent No.: US 12,429,649 B2
(45) Date of Patent: Sep. 30, 2025

(54) INTEGRATED OPTICAL STRUCTURE FOR MULTIPLEXING AND/OR DEMULTIPLEXING

(71) Applicant: IMEC VZW, Leuven (BE)

(72) Inventors: Jeonghwan Song, Heverlee (BE); Marcus Dahlem, Leuven (BE)

(73) Assignee: IMEC VZW, Leuven (BE)

( * ) Notice: Subject to any disclaimer, the term of this patent is extended or adjusted under 35 U.S.C. 154(b) by 387 days.

(21) Appl. No.: 18/066,041

(22) Filed: Dec. 14, 2022

(65) Prior Publication Data

US 2023/0194780 A1 Jun. 22, 2023

(30) Foreign Application Priority Data

Dec. 22, 2021 (EP) .................................... 21216835

(51) Int. Cl.
| | | |
|---|---|---|
| *G02B 6/12* | (2006.01) | |
| *G02B 6/124* | (2006.01) | |
| *G02B 6/293* | (2006.01) | |

(52) U.S. Cl.
CPC ......... *G02B 6/12007* (2013.01); *G02B 6/124* (2013.01); *G02B 6/29344* (2013.01); *G02B 2006/1209* (2013.01); *G02B 2006/12104* (2013.01); *G02B 2006/12159* (2013.01); *G02B 2006/12164* (2013.01)

(58) Field of Classification Search
CPC ........................... G02B 6/125; G02B 6/12007; G02B 6/29344; G02B 6/124
See application file for complete search history.

(56) References Cited

U.S. PATENT DOCUMENTS

| | | |
|---|---|---|
| 2002/0159068 A1 | 10/2002 | Pfau et al. |
| 2004/0141750 A1 | 7/2004 | Mukai |
| 2004/0247235 A1 | 12/2004 | Jenkins |
| (Continued) | | |

FOREIGN PATENT DOCUMENTS

| | | |
|---|---|---|
| CN | 102457018 A | 5/2012 |
| WO | 2017069240 A1 | 4/2017 |

OTHER PUBLICATIONS

Extended European Search Report and Written Opinion, Application No. EP 21216835.5, mailed May 19, 2022, 8 pages.

*Primary Examiner* — Michael P Mooney
(74) *Attorney, Agent, or Firm* — McDonnell Boehnen Hulbert & Berghoff LLP

(57) ABSTRACT

An integrated optical structure for multiplexing and/or demultiplexing an optical signal comprises a main waveguide having two parallel side surfaces, a first waveguide which meets the main waveguide at a first region on one of the two side surfaces, and a plurality of second waveguides which meet the main waveguide at a second region on one of the two side surfaces. The second region is spaced at a determined distance from the first region. The two side surfaces are arranged at a first angle relative to an extension direction of the first waveguide and a second angle relative to extension directions of the plurality of second waveguides. The optical structure further comprises one or more waveguide extension structures. Each waveguide extension structure is arranged adjacent to one of the two side surfaces of the main waveguide at a region that is different to the first and the second region.

20 Claims, 8 Drawing Sheets

(56) References Cited

U.S. PATENT DOCUMENTS

| | | |
|---|---|---|
| 2012/0057817 A1 | 3/2012 | Wesstrom et al. |
| 2016/0011370 A1 | 1/2016 | Okayama |
| 2017/0248760 A1* | 8/2017 | Hu .................... G02B 6/12007 |
| 2020/0264369 A1 | 8/2020 | Takabayashi et al. |

* cited by examiner

INTEGRATED OPTICAL STRUCTURE FOR MULTIPLEXING AND/OR DEMULTIPLEXING

CROSS-REFERENCE TO RELATED APPLICATIONS

The present application is a non-provisional patent application claiming priority to European Patent Application Number 21216835.5, filed Dec. 22, 2021, the contents of which are hereby incorporated by reference.

FIELD OF THE DISCLOSURE

The present disclosure relates to an optical structure for multiplexing and/or demultiplexing an optical signal. In particular, the present disclosure relates to an angled multimode interferometer.

BACKGROUND

Wavelength division (de)multiplexers are key photonic components to compose high quality and capacity systems for telecom, data-com, and bio-medical sensing applications.

Various devices, such as arrayed waveguide gratings (AWGs), cascaded Mach-Zehnders, ring resonators, and echelle gratings have been developed as wavelength splitting devices. Recently, angled multimode interferometer (MMI) based multiplexers on silicon-on-insulator (SOI) have been developed that use dispersive self-imaging in a multimode waveguide.

FIG. 1 shows an angled MMI according to a conventional example. Such an angled MMI can be used for wavelength-division multiplexing (WDM). The MMI comprises a central multimode interference waveguide connected to an input waveguide and several parallel output waveguides. The central MMI waveguide is arranged at an angle to the input and output waveguides. However, due to geometric limitations, the MMI can only be used for a coarse WDM, i.e. for multiplexing of optical channels with a large channel spacing.

In general, the channel spacing of optical channels that can be "split" by the angled MMI multiplexer depends on various geometrical parameters, such as the input and output angles, the physical spacing between the output waveguides, and the length and width of the MMI waveguide.

To achieve a reduced channel spacing in an angled MMI multiplexer either the geometrical spacing (i.e., pitch) of the output channels must be reduced, or the length of the MMI waveguide must be increased. However, due to limitations in fabrication and device size, these limitations can often not be overcome such that most angled MMIs can only perform a coarse WDM.

SUMMARY

This description provides for an improved optical structure for multiplexing and/or demultiplexing an optical signal. One or more example embodiments described herein can avoid one or more of the above-mentioned disadvantages.

Some example embodiments are defined in the enclosed independent claims. Other example embodiments are further defined in the dependent claims.

According to a first aspect, the present disclosure relates to an integrated optical structure for multiplexing and/or demultiplexing an optical signal. The optical structure comprises a main waveguide having two parallel side surfaces, a first waveguide which meets the main waveguide at a first region on one of the two side surfaces, and a plurality of second waveguides which meet the main waveguide at a second region on one of the two side surfaces. The second region is spaced at a determined distance from the first region. The two side surfaces of the main waveguide are arranged at a first angle relative to an extension direction of the first waveguide and a second angle relative to extension directions of the plurality of second waveguides. The optical structure further comprises one or more waveguide extension structures. Each waveguide extension structure is arranged adjacent to one of the two side surfaces of the main waveguide at a region that is different to the first and the second region.

This can result in a channel spacing of optical channels of different frequencies that can be multiplexed and/or demultiplexed by the optical structure and be controlled and/or adjusted. The optical signal can comprise the optical channels or can be formed by combining the optical channels.

In at least some embodiments, the one or more waveguide extension structures allow influencing the channel spacing (i.e., the spacing of channels that are split/combined by the optical structure) without changing other geometric parameters of the structure, such as the length of the main waveguide from the first to the second region (i.e., from the first waveguide to the second waveguides). For at least some arrangements of the waveguide extension structures, the channel spacing can be reduced without increasing the length of the main waveguide or reducing the pitch of the second waveguides.

As an example, the parallel side surfaces can delimit the main waveguide along its longitudinal sides in a plane that lies parallel to its extension direction.

The first angle can be defined relative to an extension direction of the first waveguide at a first point where the first waveguide meets the main waveguide, for example, at the first region. The second angle can be defined relative to extension directions of the plurality of second waveguides in a plurality of second points where the plurality of second waveguides meet the main waveguide, for example, at the second region.

The first and second angle can be identical or different, depending on the exact arrangement of the first waveguide and second waveguides. In particular, when the first waveguide and the second waveguides meet the main waveguide on opposite sides, the first and second angle are generally identical. However, if the first waveguide and second waveguides meet the main waveguide on the same side, the first and second angle are different, for instance 15° and −15°.

In at least some embodiments, such as when the first and second waveguides are arranged at the same side of the main waveguide, the length of the main waveguide (i.e., distance from first to second region) is adapted to achieve the same channel spacing as compared to a configuration where the first and second waveguides are arranged on opposite sides.

In at least some embodiments, the optical structure forms an angled multimode interferometer (MMI).

In at least some embodiments, the main waveguide is a multimode interference waveguide of the angled MMI. The angled MMI can multiplex and/or demultiplex the optical signal. The optical signal can comprise a plurality of optical channels of different frequencies.

In at least some embodiments, the at least one waveguide extension structure is arranged adjacent to a third region on one of the two side surfaces of the main waveguide. The third region is opposite to the first region or opposite to the second region. This arrangement of the waveguide extension structure can allow for reducing the channel spacing.

In at least some embodiments, a first waveguide extension structure is arranged adjacent to a third region on one of the two side surfaces of the main waveguide. The third region is opposite to the first region. A second waveguide extension structure is arranged adjacent to a fourth region on one of the two side surfaces of the main waveguide. The fourth region is opposite to the second region.

In at least some embodiments, at least one waveguide extension structure forms an asymmetric extension of the main waveguide.

For example, a main waveguide can essentially be symmetric along its extension direction (not taking into account the first and second waveguides). The waveguide extension structure can break the symmetry.

In at least some embodiments, the at least one waveguide extension structure is an integral part of the main waveguide.

For example, the main waveguide and the at least one waveguide extension structures can be fabricated in a single common step. In accordance with this example, no additional manufacturing step is required.

In at least some embodiments, at least one waveguide extension structure is at least partially made of the same material as the main waveguide.

In particular, the channel spacing can be further controlled by the shape of the at least one waveguide extension structure.

In at least some embodiments, at least one waveguide extension structure has a wedge shape.

In at least some embodiments, at least one waveguide extension structure has a curved shape.

In at least some embodiments, at least one waveguide extension structure has a concave or a convex shape.

In at least some embodiments, at least one waveguide extension structure comprises a grating structure.

In at least some embodiments, at least one waveguide extension structure comprises a mirror structure. This can enhance the reflectivity of the waveguide extension structure.

In at least some embodiments, the mirror structure is formed from a metallic mirror or a Bragg mirror.

In at least some embodiments, the optical structure further comprises a cladding which surrounds at least the main waveguide. The cladding has a lower refractive index than the main waveguide.

The cladding can also surround the waveguide extension structure, the first waveguide, and the second waveguides. The waveguide extension structure, the first waveguide and/or the second waveguides can be made of the same material as the main waveguide and can be integral with the main waveguide.

In at least some embodiments, the cladding is made of silicon dioxide, $SiO_2$.

In at least some embodiments, the main waveguide, the first waveguide and/or the second waveguides are made of silicon nitride, $Si_3N_4$.

In at least some embodiments, the integrated optical structure can be arranged on an SOI substrate.

In at least some embodiments, the optical signal comprises optical channels of different frequencies or is formed by combining the optical channels. The one or more waveguide extension structures determine a channel spacing of the optical channels of the optical signal that can be multiplexed and/or demultiplexed by the optical structure.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 2:
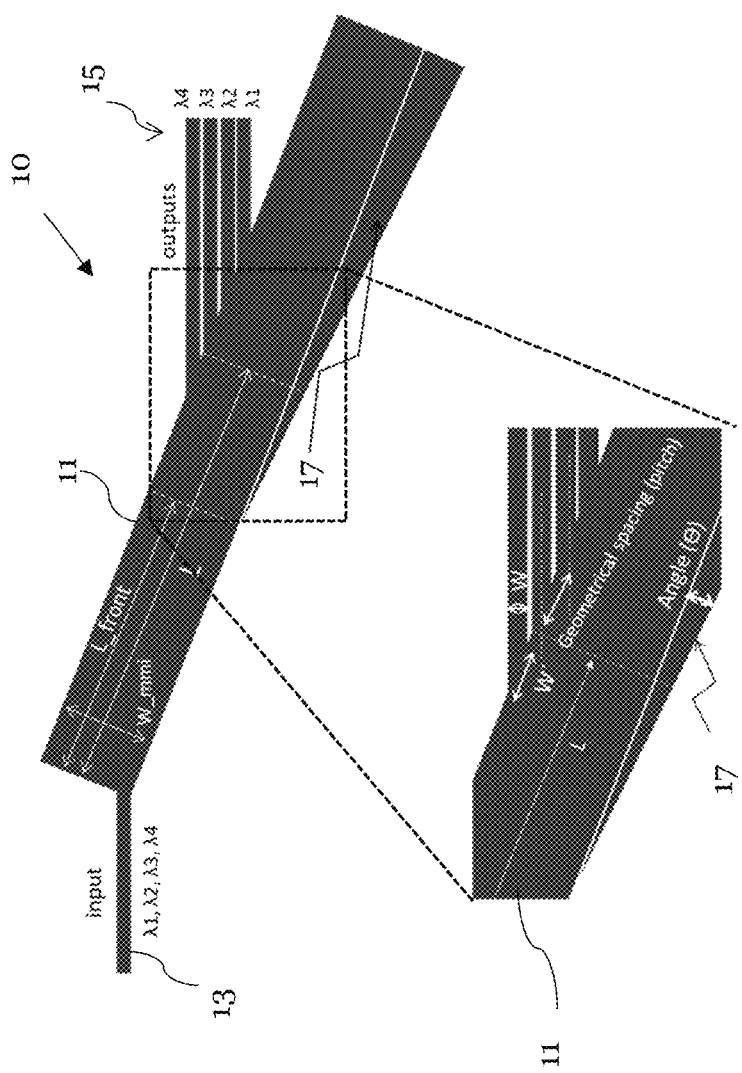
FIG. 2 shows a schematic diagram of an optical structure for multiplexing and/or demultiplexing an optical signal according to an example embodiment.

FIG. 2 shows a schematic diagram of an optical structure 10 for multiplexing and/or demultiplexing an optical signal according to an embodiment. The optical structure 10 can be an integrated optical structure, i.e. it can be integrated in an optical device, e.g. a telecommunication or sensing device.

The optical structure 10 comprises a main waveguide 11 having two parallel side surfaces, a first waveguide 13 which meets the main waveguide 11 at a first region on one of the two side surfaces, and a plurality of second waveguides 15 which meet the main waveguide 11 at a second region on one of the two side surfaces. The second region is spaced at a determined distance L from the first region. The two side surfaces of the main waveguide are arranged at a first angle relative to an extension direction of the first waveguide 13 and a second angle relative to extension directions of the plurality of second waveguides 15. The optical structure 10 further comprises one or more waveguide extension structures 17. Each waveguide extension structure 17 is arranged adjacent to one of the two side surfaces of the main waveguide 11 at a region that is different to the first and the second region.

In particular, the optical structure 10 forms an angled MMI structure. The main waveguide 11 is a multimode interference waveguide of the MMI structure. The angled MMI can be configured to multiplex and/or demultiplex the optical signal. In particular, the optical signal comprises a plurality of optical channels 80 1, λ2, λ3, λ4 with a certain channel spacing.

When used for demultiplexing, the first waveguide 13 is an input waveguide and the second waveguides 15 are output waveguides. The main waveguide 11 is configured to receive the optical signal from the input waveguide, to spatially separate the optical channels 80 1, λ2, λ3, λ4 of the optical signal, and to output in each of the plurality of output waveguides light from one of the separated optical channels λ1, λ2, λ3, λ4.

When used for multiplexing, the second waveguides 15 are input waveguides and the first waveguide 13 is an output waveguide. The main waveguide 11 is configured to receive from each of the plurality of input waveguides light signals of different frequency, to spatially combine the light signals thereby forming the optical signal, and to output the optical signal in the output waveguide. The combined optical signals form the optical channels 80 1, λ2, λ3, λ4 of the optical signal.

The optical structure 10 shown in FIG. 2 comprises one waveguide extension structure 17 which is arranged adjacent to a third region on one of the two side surfaces of the main waveguide. This third region is opposite to the second region, i.e. opposite to the second waveguides 15.

The waveguide extension structure forms an asymmetric extension of the main waveguide in the form of a wedge or triangle. As shown in FIG. 2, this wedge can be defined by a wedge angle (Θ) and a distance from the first region to the starting point of the wedge (MMI front length, L_front).

Generally, the at least one waveguide extension structure 17 is in direct physical contact with the main waveguide 11. However, it is also conceivable that the at least one waveguide extension structure 17 is not in physical contact with the main waveguide 11, i.e. it is arranged spaced from the main waveguide 11.

In particular, the at least one waveguide extension structure 17 can be an integral part of the main waveguide, i.e., it can be integrally formed with the main waveguide. For instance, the main waveguide 11 and the at least one waveguide extension structures 17 are fabricated in a common fabrication step.

The waveguide extension structure 17 can at least partially be made of the same material as the main waveguide 11.

In particular, at least one waveguide extension structure 17 can form a mirror on the side surface of the main waveguide 11. The mirror can change a direction of total reflection on the side surface.

The optical structure 10 can be arranged on a substrate, for example a silicon-on-insulator (SOI) substrate.

In the embodiment shown in FIG. 2, the first waveguide 13 and the second waveguides 15 meet the main waveguide 11 on opposite sides. Thereby, the first angle and the second angle are identical. This angle is generally between 0 and 90°. In some examples, the angle is <~40°. The angle can be varied to increase or decrease the channel spacing. However, also loss and cross-talk can be influenced by the angle.

For example, the optical structure 10 can be integrated as a WDM component in a photonics circuit, especially when using high or low index contrast waveguides.

Figure 3B:
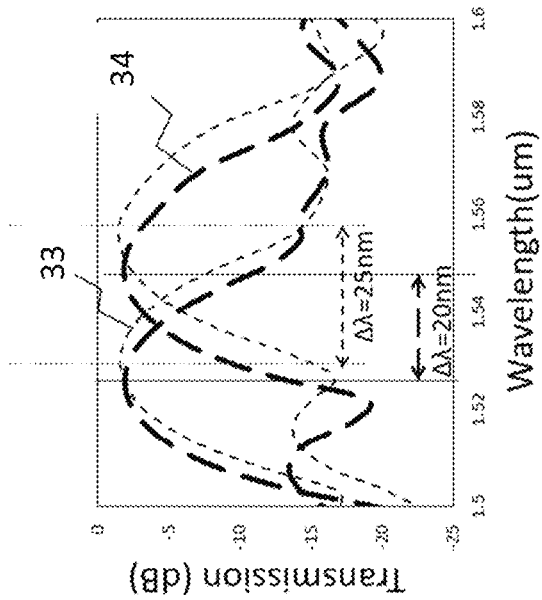
FIG. 3A and FIG. 3B show results of simulations performed with optical structures according to different example embodiments.
Figure 3A:
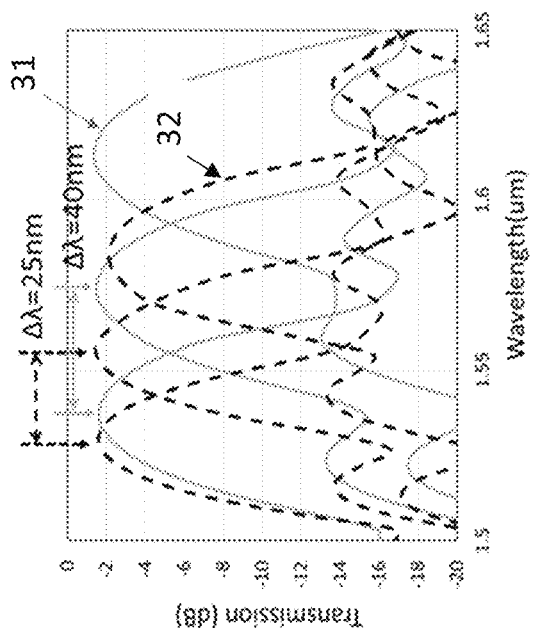

Next, FIG. 3A and FIG. 3B show results of simulations performed with optical structures 10 according to different embodiments. These simulation results show simulated spectral responses of different optical structures.

In particular, FIG. 3A and FIG. 3B both compare transmission spectra of light that is outputted at the output waveguides of two different angled MMIs. Thereby, each peak in a spectrum corresponds to an optical channel in one output waveguide. The width of each peak corresponds to the bandwidth of the respective channel (in the wavelength domain). The distance from peak-to-peak corresponds to a channel spacing of the channels that can be separated by the respective MMI and outputted in the individual output waveguides.

Figure 1:
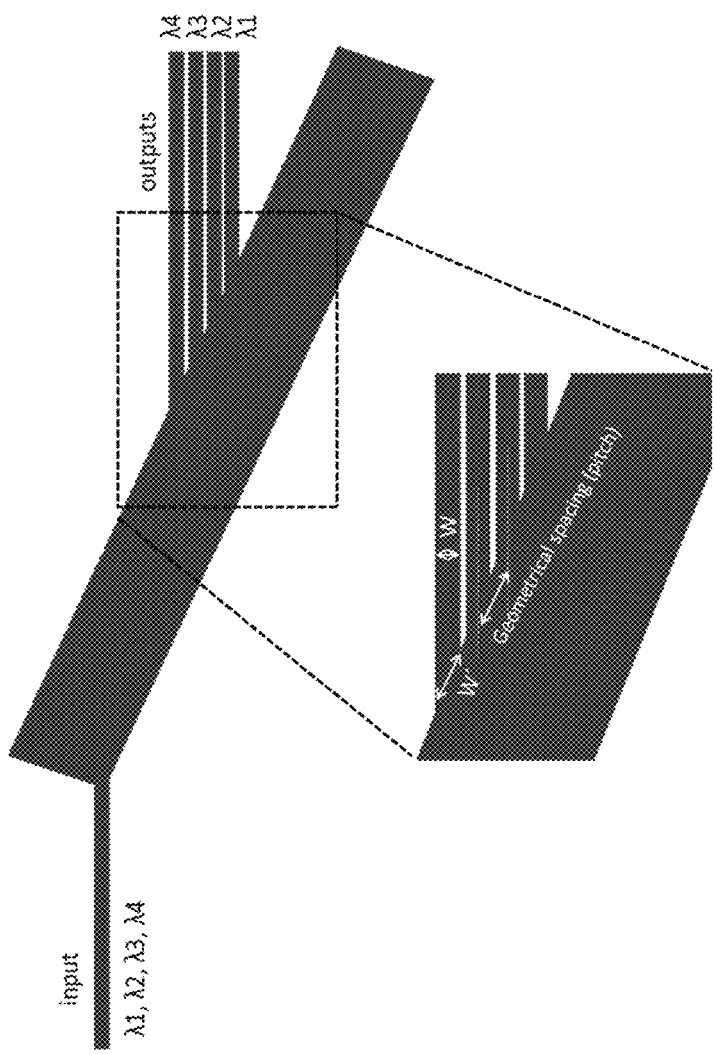
FIG. 1 shows an angled MMI according to a conventional example.

FIG. 3A compares the simulated spectral response of a reference MMI structure as shown in FIG. 1 (bold line, 31) to a simulated spectral response of the optical structure 10 shown in FIG. 2 (dashed line, 32) in a wavelength range between 1.5 μm and 1.65 μm.

Thereby, the simulated optical structure 10 with the waveguide extension structure 17 (dashed line, 32) has a main waveguide length (L) of 880 μm, a main waveguide width (W_mmi) of 14 μm, an input/output waveguide width of 3.5 μm, an MMI angle of 12°, an MMI front length (L_fron) of 480 μm, a wedge angle (θ) of 0.286°, an output waveguide pitch of 20 μm, and a refractive index of 1.95 surrounded by a cladding of refractive index 1.453. The waveguide extension structure 17 is integral with the main waveguide 11 and has the same refractive index of 1.95.

The reference MMI structure (bold line, 31) has a length (L) of 870 μm, a main waveguide width (W_mmi) of 14 μm, an input/output waveguide width of 3.5 μm, an MMI angle of 12°, an output waveguide pitch of 20 μm, and a refractive index of 1.95 surrounded by a cladding of refractive index 1.453. The difference in length by 10 μm is an example modification for the used wavelength range.

In particular, the minimum geometrical spacing (pitch) of output channels was determined to be larger than 16.83 μm. However, considering the critical size for fabrications, a minimum achievable pitch was estimated to be ~20 μm. Therefore, a 20 μm pitch was used in these simulations.

The comparison between both transmission spectra 31, 32 in FIG. 3A shows that the channel spacing is drastically reduced from 40 nm to 25 nm by the waveguide extension structure 17. Thus, by adding the waveguide extension structure 17, it is possible to perform a dense wavelength-division multiplexing (WDM) in an MMI structure that would otherwise only allow for a coarse WDM at a much larger channel spacing. To achieve a comparable decrease of the channel spacing in the reference MMI structure of FIG. 1, the length of main MMI waveguide would have to be increased to several thousand microns and/or the output waveguide pitch would have to be decrease far below the critical size for fabrication.

In general, a bandwidth of an optical channel is related to the propagation length in the central MMI waveguide 11. If the propagation length is increased, the bandwidth can be narrower and the channel spacing can be reduced. Further, the geometrical output spacing is a bottle-neck of narrowing channel spacing. An increase of the output angles and/or a decrease of the width of the output channels can also lead to a decrease of channel spacing, however, at the same time losses will be increased. The waveguide extension structure 17 offers an alternative to reduce the achievable channel spacing without adapting further geometric parameters of the structure.

The effect of the waveguide extension structure 17 can be explained as follows (in case of a demulitplexer): Light that propagates in the main waveguide 11 meets the wall of the main waveguide 11 at a specific point opposite to the output waveguides, where it reflects and is refocused towards the output waveguides. The mirror is, for instance, arranged opposite to the output waveguides and changes the focal point of the light and, thereby, the output channel position.

FIG. 3B compares simulated spectral responses 33, 34 obtained with two optical structures 10 with different waveguide extension structures 17 in a wavelength range between 1.5 µm and 1.6 µm. Thereby, both optical structures have a single wedge-type waveguide extension structure 17 which is arranged opposite to the plurality of second waveguides 15, as shown in FIG. 2.

The first optical structure (thin dashed line, 33) has a waveguide extension structure 17 with a wedge angle (θ) of 0.286°. In contrast, the second optical structure (thick dashed line, 34) has a waveguide extension structure 17 with a wedge angle (θ) of 0.497°. Both optical structures have an MMI length (L) of 900 µm. All other geometric parameters of these structures are identical to the optical structure 10 simulated in FIG. 3A.

FIG. 3B shows that the channel spacing can be even further reduced, from 25 nm to 20 nm, by modifying the wedge angle.

Next, FIG. 4A, FIG. 4B, FIG. 4C, and FIG. 4D show schematic diagrams of the optical structure 10 with different waveguide extension structures 17 according to an embodiment.

Figure 4A:
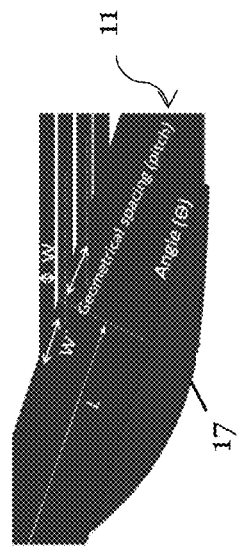
FIG. 4A, FIG. 4B, FIG. 4C, and FIG. 4D show schematic diagrams of an optical structure with different waveguide extension structures according to different example embodiments.
Figure 4B:
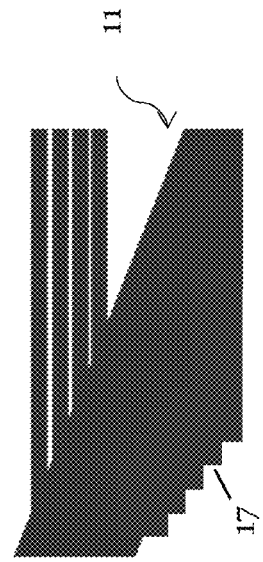
Figure 4C:
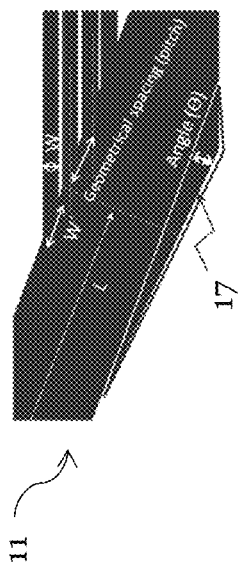

FIG. 4A shows a linear, in particular wedge-shaped waveguide extension structure 17 with wedge angle θ. The spectral response of an optical structure with such an extension structure is, for instance, shown in FIG. 3A and FIG. 3B. FIG. 4B and FIG. 4C show different curved shape waveguide extension structures 17, in particular a convex shaped waveguide extension structure 17 (FIG. 4B), and an adiabatic respectively concave shaped waveguide extension structure 17 (FIG. 4C).

Figure 4D:
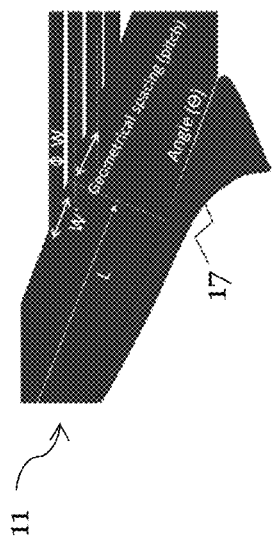

FIG. 4D shows an optical structure 10 with a waveguide extension structure 17 which forms a grating.

Depending on the shape and size of the waveguide extension structure, the spectral response and, in particular, the channel spacing of channels that can be split respectively combined by the optical structure 10 can be changed.

Figure 5B:
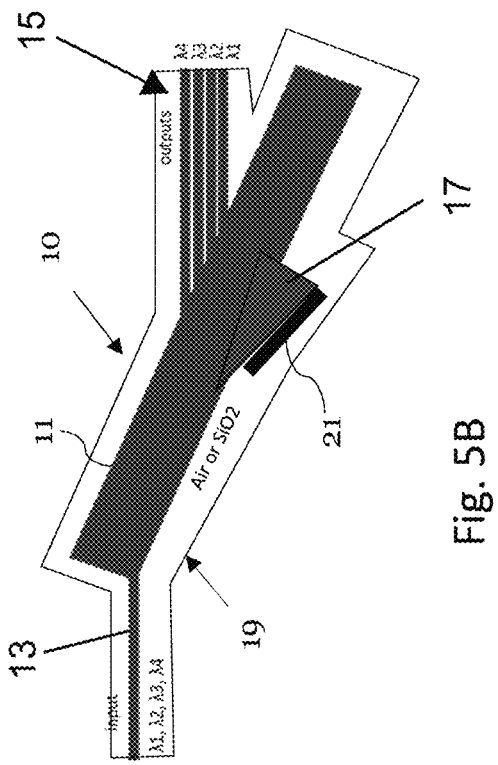
FIG. 5A and FIG. 5B show schematic diagrams of an optical structure according to different example embodiments.
Figure 5A:
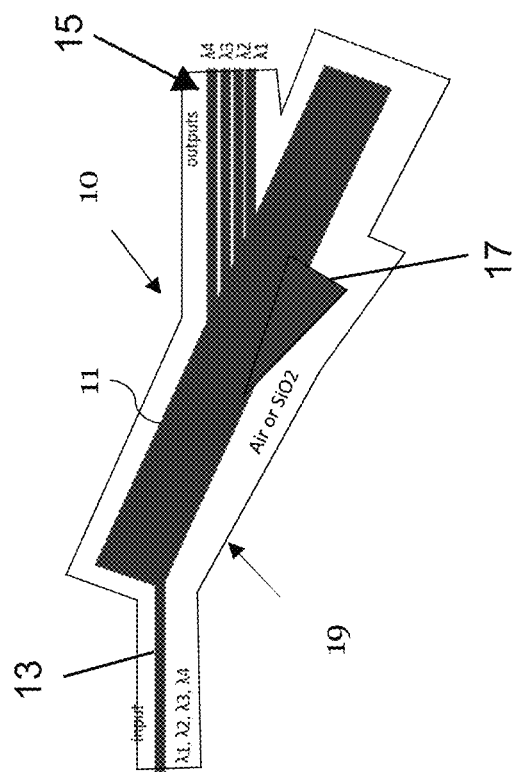

Next, FIG. 5A and FIG. 5B show schematic diagrams of the optical structure 10 according to different embodiments.

The optical structures 10 shown in FIG. 5A and FIG. 5B both comprise a single wedge respectively triangle shaped waveguide extension structure 17 which is arranged adjacent to the main waveguide 11, opposite to the plurality of second waveguides 15 that can form the output waveguides of an angled MMI demultiplexer.

The optical structures 10 in FIG. 5A and FIG. 5B both comprise a cladding 19 which surrounds the main waveguide 11 and the waveguide extension structure 17. The cladding 19 can further surround the first waveguide 13 and the second waveguides 15 at least partially.

In at least some embodiments, the cladding 19 has a lower refractive index than the waveguides 11, 13, 15 and the waveguide extension structure 17. For example, the cladding 19 can be made of silicon dioxide ($SiO_2$), air or another low index material. The main waveguide 11, the first waveguide 13 and the second waveguides 15 can be made of Si, silicon nitride ($Si_3N_4$), silicon oxynitride (SiON), or $SiO_2$. The index difference between cladding 19 and the waveguides 11, 13, 15 and the waveguide extension structure 17 can lead to total internal reflection (TIR) and, thus, can enhance internal reflections and reduce losses in the optical structure 10.

In the example shown in FIG. 5B, the waveguide extension structure 17 comprises an additional mirror structure 21. The mirror structure 21 can be formed from a metallic mirror or a Bragg mirror. The mirror structure can increase the reflectivity of the waveguide extension structure 17.

FIG. 6A, FIG. 6B, FIG. 6C, and FIG. 6D show schematic diagrams of the optical structure 10 according to different embodiments.

Figure 6B:
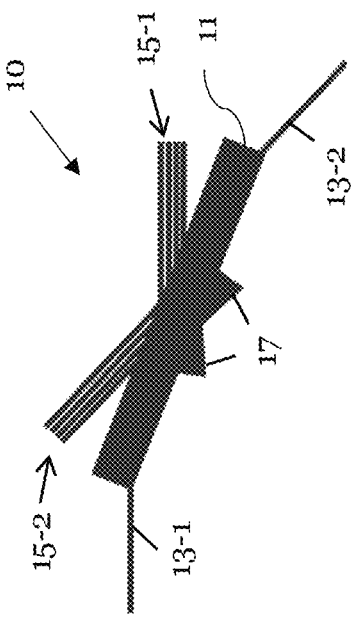
FIG. 6A, FIG. 6B, FIG. 6C, and FIG. 6D show schematic diagrams of an optical structure according to different example embodiments.
Figure 6D:
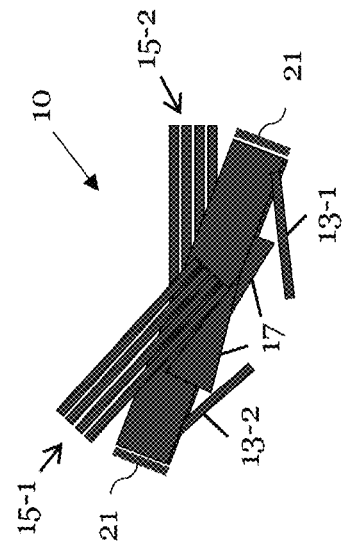
Figure 6A:
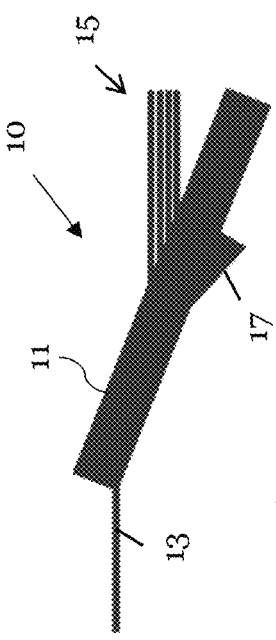

The optical structure 10 shown in FIG. 6A is similar to the optical structures 10 in FIG. 2 or FIG. 5A and FIG. 5B with a single, wedge-shaped waveguide extension structure 17 which is arranged adjacent to the main waveguide 11, opposite to the plurality of second waveguides 15. When used as a demultiplexer, the first waveguide 13 can be an input waveguide and the plurality of second waveguides 15 can be output waveguides.

The optical structure 10 shown in FIG. 6B is a superposition of two optical structures 10 according to FIG. 6A. The optical structure 10 in FIG. 6B, thus, comprises a first waveguides 13-1, a plurality of second waveguides 15-1, a third waveguide 13-2, and a plurality of fourth waveguides 15-2. For instance, the first waveguide 13-1 and the third waveguide 13-2 can both form input waveguides and the plurality of second waveguides 15-1 and the plurality of fourth waveguides 15-2 can form respective output waveguides. A respective waveguide extension structure 17 is arranged adjacent to the main waveguide 11 opposite of the plurality of second waveguides 15-1 and the plurality of fourth waveguides 15-2.

Figure 6C:
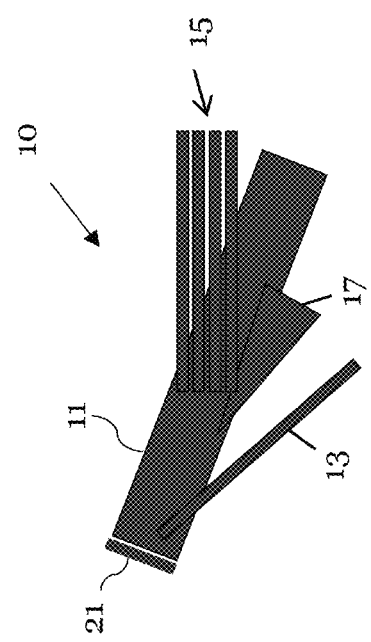

The optical structure 10 shown in FIG. 6C is similar to the optical structure 10 of FIG. 6A, wherein the first waveguide 13 is arranged at a different angle relative to the main waveguide 11. The optical structure 10 in FIG. 6C comprises an additional mirror structure 21 on a first end of the main waveguide 11. The mirror structure 21 is, for example, arranged to redirect light, which enters the main waveguide 11 through the first waveguide 13, in the direction of the second waveguides 15 and vice versa. The mirror structure 21 can comprise a metallic mirror or a Bragg mirror. Compared to the optical structures 10 shown in FIG. 6A, the optical structure 10 in FIG. 6C can have a reduced size while achieving a comparable reduction of the channel spacing.

The optical structure 10 shown in FIG. 6D is a superposition of two optical structures 10 according to FIG. 6C. The optical structure 10 in FIG. 6b comprises a first waveguides 13-1, a plurality of second waveguides 15-1, a third waveguide 13-2, and a plurality of fourth waveguides 15-2.

Figure 7:
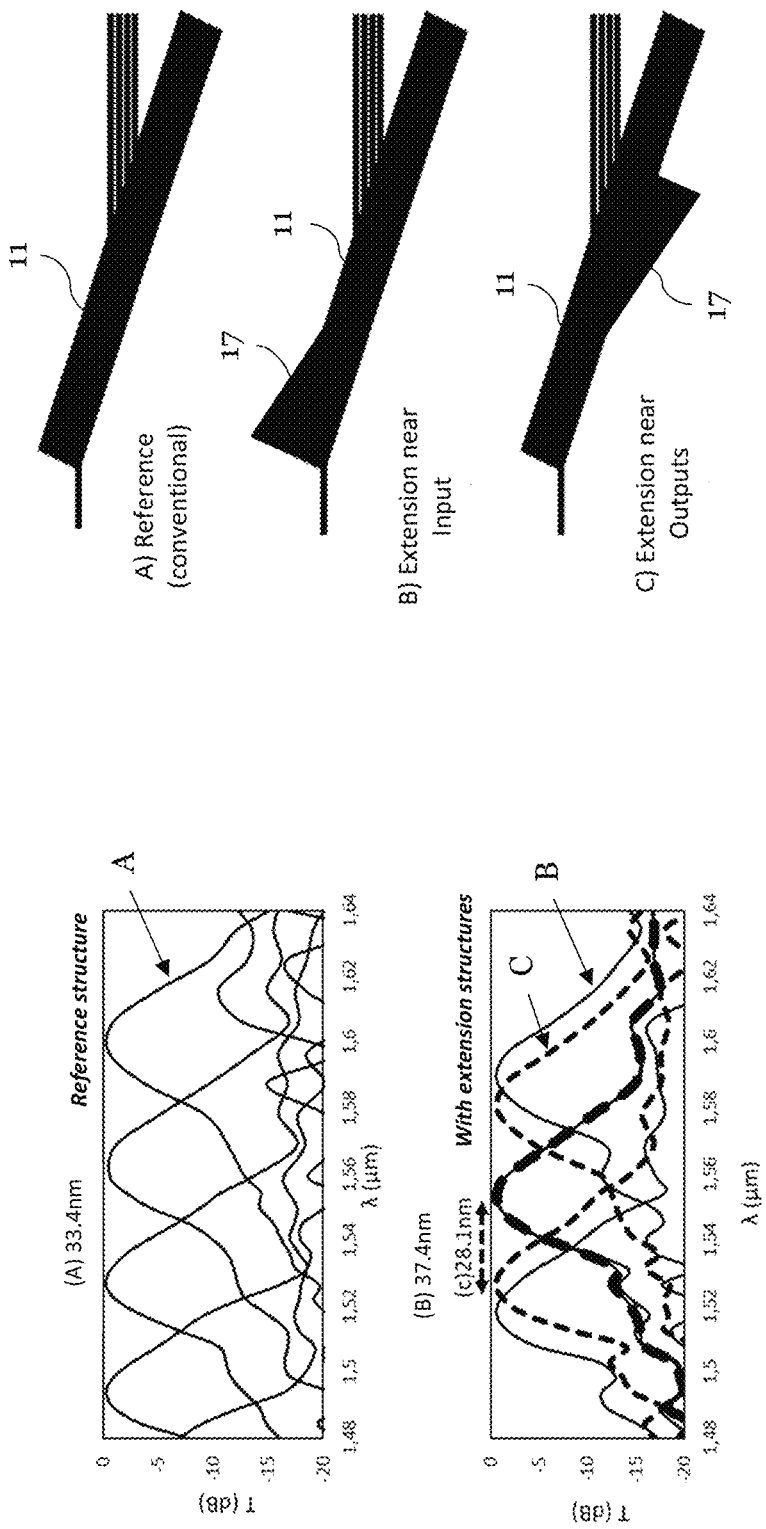
FIG. 7 shows results of simulations performed with optical structures according to different example embodiments.

Next, FIG. 7 shows results of simulations performed with optical structures 10 according to different embodiments. In particular, FIG. 7 compares the spectral response of the three depicted optical structures A, B, and C in the wavelength range between 1.48 µm and 1.64 µm, when used as angled MIMI demultiplexer.

The top chart shows the simulated spectral response of the reference structure A, which is depicted on the top left. This reference structure corresponds an angled MMI according to the state of the art without a waveguide extension structure. The simulated transmission spectrum of this reference structure A shows a channel spacing of 33.4 nm.

The bottom chart shows the simulated spectral response of the optical structures B and C as depicted on the center right and bottom right of FIG. 7. Both of these structures have a wedge-shaped waveguide extension structure 17 with identical wedge angle arranged at different positions of the main waveguide 11, namely opposite to the input waveguide (structure B) and opposite to the output waveguides (structure C). Otherwise, the geometrical and optical parameters of the simulated structures A, B, and C are identical with the exception of a slightly enhanced length of the main waveguide of structures B and C of 60 µm compared to structure A.

The simulated transmission spectrum of the structures with waveguide extension structure 17 show an increased channel spacing of 37.4 nm for the structure B and a decrease channel spacing of 28.1 nm for the structure C.

Figure 8:
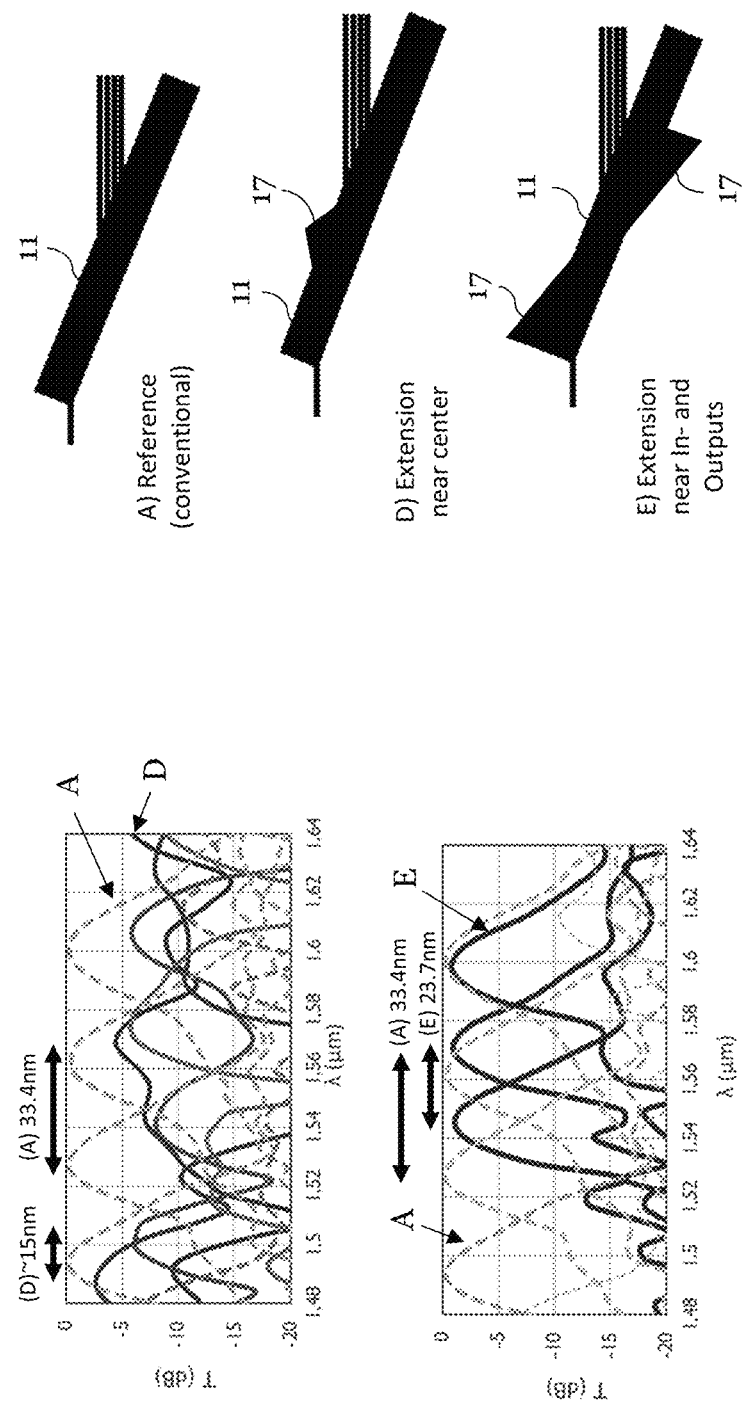
FIG. 8 shows results of simulations performed with optical structures according to different example embodiments.

Next, FIG. 8 shows results of simulations performed with optical structures 10 according to different embodiments. In particular, FIG. 8 compares the spectral response of the additional optical structures D and E to the same reference structure A in the wavelength range between 1.48 µm and 1.64 µm.

The top chart compares the reference structure A with the structure D which has a waveguide extension structure 17 arranged adjacent to the main waveguide 11 at a region in-between the input and output waveguides. Thereby, the length of the main waveguide 11 between input and output waveguides is slightly reduced compared to the reference structure. The transmission spectrum of structure D shows a plurality of partially overlapping peaks with channel spacing that can be as low as 15 nm.

The bottom chart compares the reference structure A with the structure E which has two waveguide extension structures 17 arranged adjacent to the main waveguide 11, wherein a first waveguide extension structure 17 is arranged opposite to the input waveguide and a second waveguide extension structure 17 is arranged opposite to the output waveguides. Thereby, the length of the main waveguide 11 between input and output waveguides is slightly enhanced compared to the reference structure. The transmission spectrum of structure D shows a reduced channel spacing of 23.7 nm in this structure.

The simulation results in FIG. 7 and FIG. 8 show that the channel spacings of an angled MMI can be controlled by the location and number of waveguide extension structures 17. With certain arrangements of the waveguide extension structure 17, the channel spacing of channels that can be split by these structures can be drastically reduced, while other arrangements can lead to an enhancement of the channel spacing.

In a conventional MMI structure, such as structure A in FIG. 7, the channel spacing between two adjacent optical channels is limited by the critical dimension of fabrication. The location and geometric separation of optical channels for target wavelengths is defined by the length of the MMI, in particular the distance between input and output waveguides, and the geometric arrangement of input/output waveguides. For example, the width of input and output waveguides is typically designed to be larger than 1 µm. If it is smaller, the channel spacing can be reduced slightly but the loss may be increased. The addition of the waveguide extension structure 17 allows for reducing the channel spacing without having to adapt other geometric parameters of the structure.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. An integrated optical structure for multiplexing and/or demultiplexing an optical signal, wherein the optical signal comprises optical channels of different frequencies or is formed by combining the optical channels, and wherein the integrated optical structure comprises:
    a main waveguide having two parallel side surfaces that delimit the main waveguide along its longitudinal sides and run parallel to its extension direction;
    a first waveguide which meets the main waveguide at a first region on one of the two parallel side surfaces;
    a plurality of second waveguides which meet the main waveguide at a second region on one of the two parallel side surfaces, wherein:
        the second region is spaced at a determined distance from the first region,
        the two parallel side surfaces of the main waveguide are arranged at a first angle relative to an extension direction of the first waveguide and a second angle relative to extension directions of the plurality of second waveguides, and and
    one or more waveguide extension structures configured to control a channel spacing of the optical channels of different frequencies that can be multiplexed via the second waveguides used as input waveguides and the first waveguide used as an output waveguide and/or demultiplexed via the first waveguide used as an input waveguide and the second waveguides used as output waveguides, wherein each waveguide extension structure is arranged adjacent to one of the two parallel side surfaces of the main waveguide at a region that is different to the first and the second region.

2. The integrated optical structure of claim 1, wherein the integrated optical structure forms an angled multimode interferometer.

3. The integrated optical structure of claim 2, wherein at least one waveguide extension structure is arranged adjacent to a third region on one of the two parallel side surfaces of the main waveguide, and wherein the third region is opposite to the first region or opposite to the second region.

4. The integrated optical structure of claim 2, wherein a first waveguide extension structure is arranged adjacent to a third region on one of the two parallel side surfaces of the main waveguide, wherein the third region is opposite to the first region, wherein a second waveguide extension structure is arranged adjacent to a fourth region on one of the two parallel side surfaces of the main waveguide, and wherein the fourth region is opposite to the second region.

5. The integrated optical structure of claim 1, wherein a first waveguide extension structure is arranged adjacent to a third region on one of the two parallel side surfaces of the main waveguide, wherein the third region is opposite to the first region, wherein a second waveguide extension structure is arranged adjacent to a fourth region on one of the two parallel side surfaces of the main waveguide, and wherein the fourth region is opposite to the second region.

6. The integrated optical structure of claim 5,
wherein at least one waveguide extension structure forms an asymmetric extension of the main waveguide.

7. The integrated optical structure of claim 1,
wherein at least one waveguide extension structure is arranged adjacent to a third region on one of the two parallel side surfaces of the main waveguide, and
wherein the third region is opposite to the first region or opposite to the second region.

8. The integrated optical structure of claim 7,
wherein at least one waveguide extension structure forms an asymmetric extension of the main waveguide.

9. The integrated optical structure of claim 1,
wherein at least one waveguide extension structure forms an asymmetric extension of the main waveguide.

10. The integrated optical structure of claim 1,
wherein at least one waveguide extension structure is an integral part of the main waveguide.

11. The integrated optical structure of claim 1,
wherein at least one waveguide extension structure is at least partially made of a same material as the main waveguide.

12. The integrated optical structure of claim 1,
wherein at least one waveguide extension structure has a wedge shape.

13. The integrated optical structure of claim 1,
wherein at least one waveguide extension structure has a curved shape.

14. The integrated optical structure of claim 13,
wherein the at least one waveguide extension structure has a concave or a convex shape.

15. The integrated optical structure of claim 1,
wherein at least one waveguide extension structure comprises a grating structure.

16. The integrated optical structure of claim 1,
wherein at least one waveguide extension structure comprises a mirror structure.

17. The integrated optical structure of claim 16,
wherein the mirror structure is formed from a metallic mirror or a Bragg mirror.

18. The integrated optical structure of claim 17,
wherein the integrated optical structure further comprises a cladding which surrounds at least the main waveguide, and
wherein the cladding has a lower refractive index than the main waveguide.

19. The integrated optical structure of claim 1,
wherein the integrated optical structure further comprises a cladding which surrounds at least the main waveguide, and
wherein the cladding has a lower refractive index than the main waveguide.

20. The integrated optical structure of claim 19, wherein the cladding is made of silicon dioxide.

* * * * *